US012521999B2

(12) United States Patent
Oishi et al.

(10) Patent No.: US 12,521,999 B2
(45) Date of Patent: Jan. 13, 2026

(54) PRINTING APPARATUS

(71) Applicant: Toshiba Tec Kabushiki Kaisha, Tokyo (JP)

(72) Inventors: Sadatoshi Oishi, Fuji Shizuoka (JP); Masakazu Kato, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 229 days.

(21) Appl. No.: 18/348,908

(22) Filed: Jul. 7, 2023

(65) Prior Publication Data

US 2024/0190142 A1 Jun. 13, 2024

(30) Foreign Application Priority Data

Dec. 9, 2022 (JP) ................................ 2022-197212

(51) Int. Cl.
*B41J 3/407* (2006.01)
*B41J 2/325* (2006.01)

(52) U.S. Cl.
CPC ............ *B41J 3/4075* (2013.01); *B41J 2/325* (2013.01)

(58) Field of Classification Search
CPC . B41J 3/4075; B41J 2/325; B41J 17/32; B41J 35/00; B41J 2/315; B41J 33/003; B41J 33/12; B41J 2/32; B41F 16/00; B41F 16/0006; B41F 16/0026; B41F 16/0033
See application file for complete search history.

(56) References Cited

U.S. PATENT DOCUMENTS

2003/0128269 A1 7/2003 Squires
2019/0070867 A1* 3/2019 Seki ........................ B41J 17/32

FOREIGN PATENT DOCUMENTS

JP 2000355137 A 12/2000
JP 2001354343 A 12/2001
JP 2002103734 A 4/2002
JP 2004322403 A 11/2004
JP 2006232449 A 9/2006
JP 2007261769 A 10/2007
JP 2009166462 A 7/2009
JP 2010089360 A 4/2010
JP 2013174562 A 9/2013

OTHER PUBLICATIONS

Extended European Search Report dated Dec. 4, 2023, mailed in European Application No. 23193408.4, 9 pages.
Extended European Search Report dated Nov. 29, 2023, mailed in counterpart European Application No. 23193422.5, 9 pages.

* cited by examiner

*Primary Examiner* — Kristal Feggins
(74) *Attorney, Agent, or Firm* — Kim & Stewart LLP

(57) ABSTRACT

According to one embodiment, a printing apparatus includes a shaft on which an ink ribbon roll with a wireless tag can be mounted. The ink ribbon roll rotates about the shaft. An antenna for communication with the wireless tag is on an outer peripheral surface of the shaft. A wiring is on the outer peripheral surface of the shaft and connects to the antenna. A protective sleeve is provided to be between the shaft and the mounted ink ribbon roll. The protective sleeve covers an end portion of the shaft and the wiring at the end portion. A bearing is outside the protective sleeve. The bearing is rotatable about the protective sleeve. A printing unit is configured to perform printing on a medium to be printed with ink ribbon drawn out of the ink ribbon roll.

16 Claims, 6 Drawing Sheets

PRINTING APPARATUS

CROSS-REFERENCE TO RELATED APPLICATION

This application is based upon and claims the benefit of priority from Japanese Patent Application No. 2022-197212, filed Dec. 9, 2022, the entire contents of which are incorporated herein by reference.

FIELD

Embodiments described herein relate generally to a printing apparatus using an ink ribbon.

BACKGROUND

A label printer of a certain type places an ink ribbon on a long piece of label paper then conveys the ribbon along the label paper to transfer ink from the ink ribbon to the label paper using a thermal head. By this method, the label printer prints various types of information such as a bar code on the label paper, such as on each individual label on the label paper.

Typically, the label printer changes a printing speed according to a type of an ink ribbon to be used. In the related art, there is a technique of providing a wireless tag on a ribbon roll around which the ink ribbon has been wound and then performing data communication between the printer and the wireless tag. By using this technique, a printing speed can be automatically set to a speed suitable for the ink ribbon on any ribbon roll newly mounted on the printer.

In order to perform the data communication with the wireless tag of the ribbon roll, the printer needs an antenna. For good data communication with the wireless tag, it is generally necessary to place the antenna on the printer main body side close to the wireless tag of the ribbon roll.

The mounted ribbon roll can be replaced with a new ribbon roll after the ink ribbon on the old ribbon roll is used up. Therefore, in the label printer in the related art, whenever the ribbon roll is replaced, there is a concern that the presence of more than one ribbon roll may interfere with the appropriate communication between the antenna of the printer main body and the new ribbon roll.

DETAILED DESCRIPTION

Figure 1:
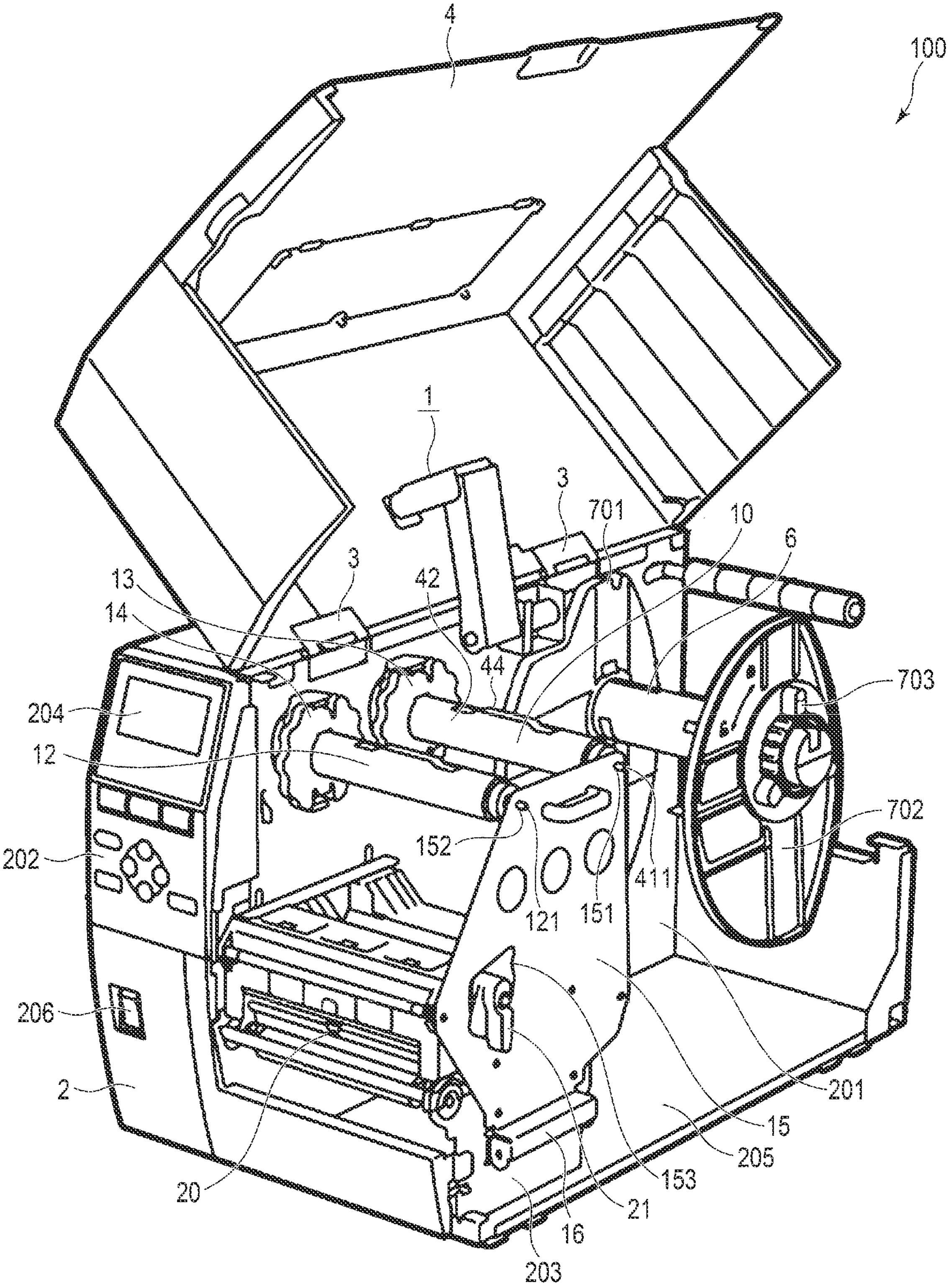
FIG. 1 is a schematic view showing a label printer according to a first embodiment.

In general, according to one embodiment, a printing apparatus that has improved workability when a ribbon roll is replaced is described.

According to one embodiment, a printing apparatus includes a shaft on which an ink ribbon roll with a wireless tag can be mounted. The ink ribbon roll is configured to rotate about the shaft. An antenna for communication with the wireless tag of the ink ribbon roll is on an outer peripheral surface of the shaft. A wiring is on the outer peripheral surface of the shaft and connects to the antenna. A protective sleeve is configured to be between the shaft and the mounted ink ribbon roll. The protective sleeve covers an end portion of the shaft and the wiring at the end portion of the shaft. A bearing is outside the protective sleeve. The bearing is rotatable about the protective sleeve. A printing unit is configured to perform printing on a medium to be printed with ink ribbon drawn out of the ink ribbon roll.

Hereinafter, certain example embodiments will be described with reference to the drawings. In each figure, the same or substantially similar components are denoted by the same reference symbols. In description of the drawings and embodiments, aspects already described may be omitted from description of subsequent drawings and embodiments. In the drawings, depicted scale may be appropriately changed drawing-to-drawing and from an actual embodiment. In the drawings, configuration may be simplified and aspects may be omitted for easier understanding of the description.

First Embodiment

Hereinafter, a label printer 100 according to a first embodiment will be described with reference to FIGS. 1 to 6. The label printer 100 is an example of a printing apparatus.

As shown in FIG. 1, the label printer 100 includes a housing 2 and a cover 4. The cover 4 is rotatably connected to the housing 2 via two hinges 3. The cover 4 is rotatable between an open position shown in FIG. 1 where an interior of the housing 2 is exposed and a closed position where the interior of the housing 2 is covered. A damper 1 is provided between the cover 4 and the housing 2 to moderate (slow) the opening/closing operation of the cover 4. When the cover 4 is in a closed state, the label printer 100 has a substantially rectangular block outer shape.

An operation unit 202, a display unit 204, and a power switch 206 are provided on a front surface of the housing 2. Information related to label paper, the number of sheets to be printed, and the like are input by the operation unit 202. The display unit 204 displays operation information, an operation menu, and the like.

The label printer 100 includes a supply shaft 6 on which a label paper roll can be mounted, a feeding shaft 10 to which a ribbon roll with unused ink ribbon wound around a paper core 30 (FIG. 5) is detachably attached, a winding shaft 12 to which a ribbon roll for used ink ribbon is detachably attached, and a printing unit 20. The printing unit 20 is an example of a printing unit.

The label paper roll is formed by winding a long strip of label paper into a roll. The label paper has a plurality of labels side by side to one another and attached to one surface of a backing paper (mounting paper). Each label has an adhesive layer on a surface on a backing paper side. The label is attachable to and detachable from the backing paper. The labels are designed to be removed from the backing paper to be attached to another object after being peeled off from the backing paper. A label paper roll is formed by winding a piece of label paper around a core in a direction in which the surface of the backing paper to which the labels are attached faces inward (towards the core). The label paper is an example of a medium to be printed. The medium to be printed is not limited to label paper, and may be, for example, thermal paper.

A ribbon roll is formed by winding a long ink ribbon into a roll shape. The ink ribbon holds ink to be transferred to the label paper by heat. An unused ribbon roll is formed by winding a fresh, unused ink ribbon around a paper core 30, and a diameter thereof becomes small due to being used. A used ribbon roll is formed by winding the ink ribbon after the ink transfer, and a diameter thereof gradually increases with used ribbon accumulation. That is, the used ribbon roll is obtained by winding the ink ribbon drawn out from the unused ribbon roll downstream of the printing unit 20.

Ends of the supply shaft 6, the feeding shaft 10, and the winding shaft 12 on one side are fixed to a side wall 201 of the housing 2. That is, the side wall 201 holds the three shafts 6, 10, and 12 in a cantilever state. The winding shaft 12 has substantially the same structure as the feeding shaft 10 except that an antenna 40 (FIGS. 2 and 3) is not provided. Therefore, separate description of the winding shaft 12 can be omitted.

Two hold plates 701 and 702 respectively abutting on both end surfaces of the label paper roll in an axial direction are provided near both ends of the supply shaft 6 in a longitudinal direction. The hold plate 701 on a back side close to the side wall 201 can be moved along the longitudinal direction of the supply shaft 6. The hold plate 701 determines an attachment position of the label paper roll in the axial direction, so that a center of the label paper roll in the axial direction is aligned with a center of the label printer 100. The hold plate 702 on a front side attached to a vicinity of an end portion of the supply shaft 6 on a side away from the side wall 201 of the housing 2 is fixed to the supply shaft 6 by a fixture 703.

When the label paper roll is to be attached to the supply shaft 6, the label paper roll is placed on the supply shaft 6 with the hold plate 702 on the front side detached from the supply shaft 6. Thereafter, the hold plate 702 on the front side is attached to an end portion of the supply shaft 6 on the front side. The label paper of the label paper roll is drawn out of the label paper roll by a conveyance roller 68 (FIG. 6), passes through the printing unit 20, and is discharged from the label printer 100.

The feeding shaft 10 and the winding shaft 12 of the ribbon roll are respectively provided with stopper plates 13 and 14 near the side wall 201 of the housing 2. The stopper plates 13 and 14 can be moved along longitudinal directions of the shafts 10 and 12. The stopper plate 13 abuts against one end of the unused ribbon roll on the feeding shaft 10 in the axial direction, and aligns the center of the ribbon roll with the center position of the label printer 100. The stopper plate 14 abuts against one end of the used ribbon roll on the winding shaft 12, and aligns the center of the ribbon roll with the center position of the label printer 100.

A ribbon shaft fixing plate 15 is provided at a position facing end portions of the feeding shaft 10 and the winding shaft 12 on the front side away from the side wall 201. The ribbon shaft fixing plate 15 is rotatably connected to a support plate 203 erected upward from a bottom wall 205 of the housing 2 via a hinge 16. The ribbon shaft fixing plate 15 has a receiving hole 151 for receiving a distal end 411 of a fixing shaft 41 of the feeding shaft 10 (distal end 411 may also be referred to as distal end 411 of the feeding shaft 10), and a receiving hole 152 for receiving a distal end 121 of the winding shaft 12. The ribbon shaft fixing plate 15 has an insertion hole 153 through which a head lever 21 of the printing unit 20 can be inserted.

When the ribbon roll is to be attached to the feeding shaft 10, the ribbon shaft fixing plate 15 can be opened, and the ribbon roll attached to the feeding shaft 10. Thereafter, the ribbon shaft fixing plate 15 is rotated to a position shown in the drawing, the distal end 411 of the feeding shaft 10 is inserted into the receiving hole 151, and the distal end 121 of the winding shaft 12 is inserted into the receiving hole 152. In this state, the ribbon shaft fixing plate 15 fixes the distal end 411 of the feeding shaft 10 and the distal end 121 of the winding shaft 12.

The ink ribbon drawn out of the ribbon roll attached to the feeding shaft 10 passes through the printing unit 20, and is then wound by the winding shaft 12. The printing unit 20 conveys the ink ribbon (while superposing the ink ribbon on the label paper) and passes the stacked ink ribbon and label paper through the printing unit 20 at the same speed as the label paper.

The printing unit 20 includes a thermal head disposed on a side of the ink ribbon opposite to the label paper. The printing unit 20 includes a platen roller at a position facing the thermal head with the ink ribbon and the label paper interposed therebetween during printing. The printing unit 20 presses the ink ribbon against the label paper with the thermal head to thermally transfer the ink of the ink ribbon to the label paper. The printing unit 20 prints a two-dimensional bar code or the like on a label of the label paper.

Figure 2:
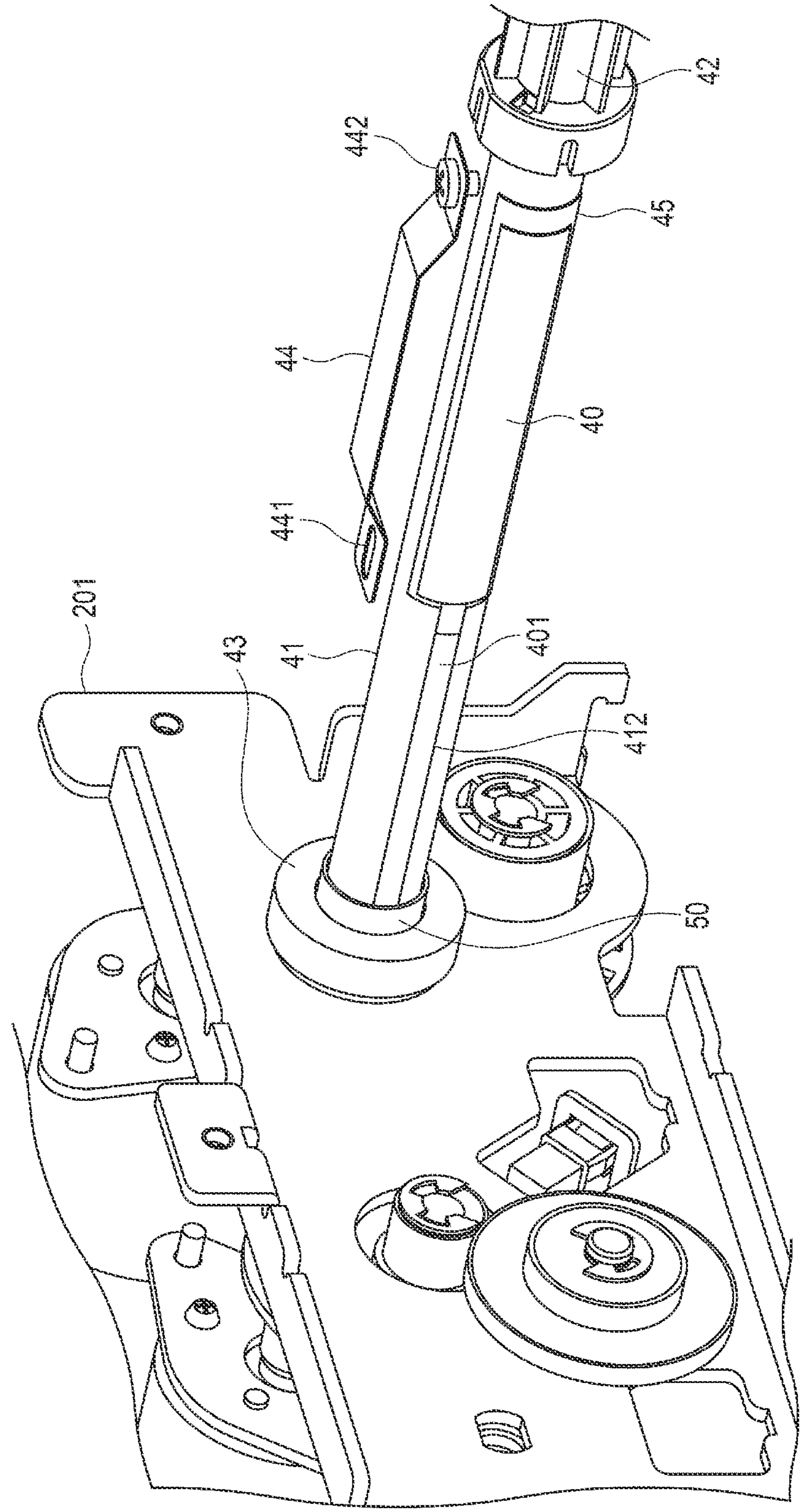
FIG. 2 is a partially enlarged perspective view showing a portion of a feeding shaft.
Figure 3:
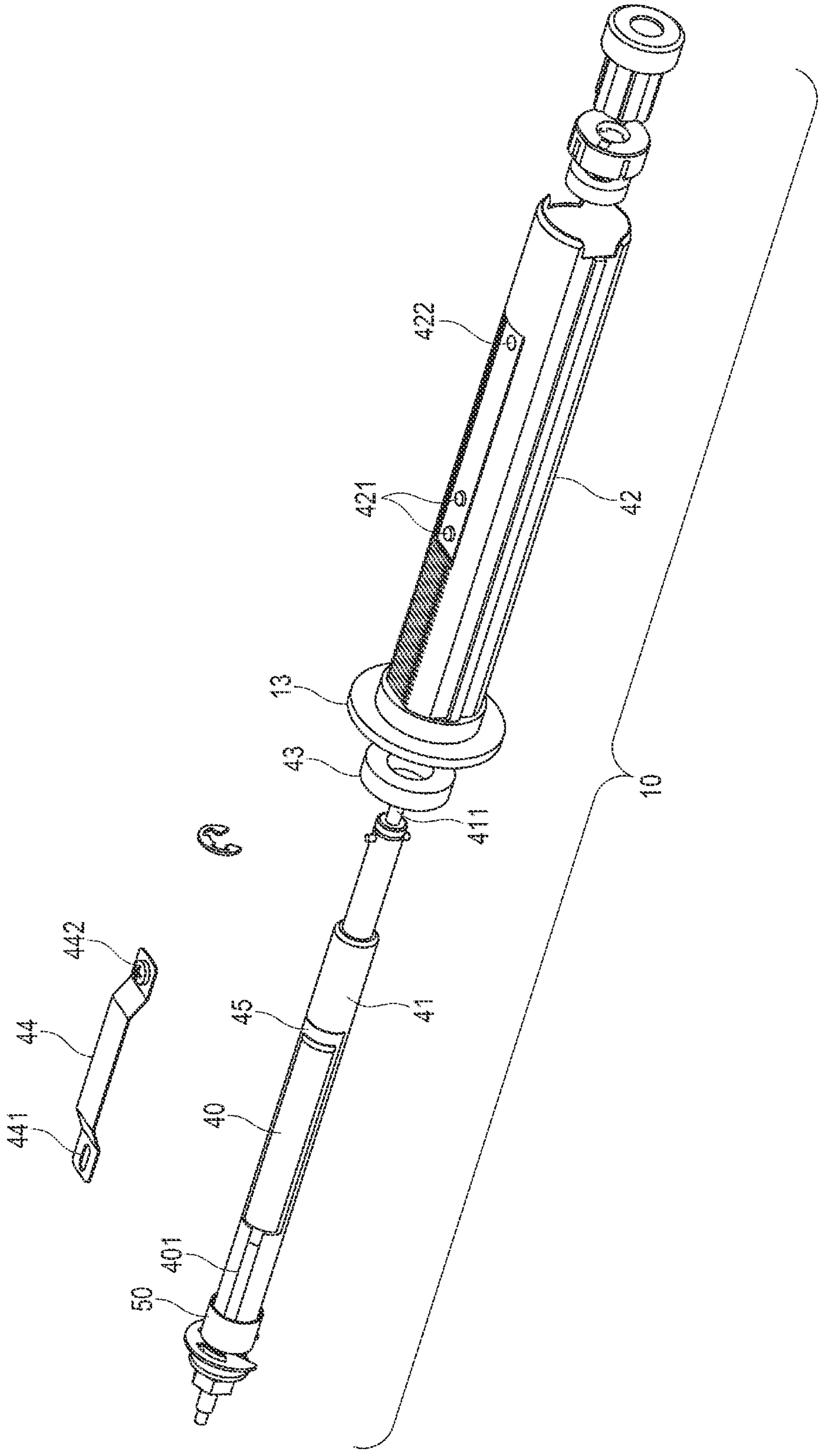
FIG. 3 is an exploded perspective view of a feeding shaft.

As shown in FIGS. 2 and 3, the feeding shaft 10 includes the fixing shaft 41 fixed to the side wall 201 of the housing 2 in the cantilever state, an intermediate sleeve 42 coaxially disposed outside the fixing shaft 41, and a bearing 43 coaxially disposed outside the fixing shaft 41. The fixing shaft 41 is an example of a shaft.

The fixing shaft 41 is, for example, a solid metal rod and is fixed to the side wall 201 of the housing 2 in a cantilever state using a bolt. The distal end 411 of the fixing shaft 41 protrudes from an end of the intermediate sleeve 42.

The intermediate sleeve 42 has a substantially cylindrical shape. The bearing 43 is provided inside the intermediate sleeve 42 near an end thereof on a side wall 201 side. The bearing 43 is fixed to the intermediate sleeve 42 by being fitted into an inner side of the end portion of the intermediate sleeve 42. The bearing 43 has a cylindrical shape and can be formed of resin or metal. The inner diameter of the intermediate sleeve 42 is substantially the same as the outer diameter of the bearing 43.

The intermediate sleeve 42 is rotatable around the fixing shaft 41 on the bearing 43. The intermediate sleeve 42 includes the stopper plate 13 on an outer side near the end on the side wall 201 side. The stopper plate 13 can be moved in the longitudinal direction of the intermediate sleeve 42 and can be fixed at a desired position along the longitudinal direction.

An outer peripheral surface of the intermediate sleeve 42 has two boss portions 421 for positioning a plate spring 44 and a screw hole 422 for fastening and fixing the plate spring 44 to the outer peripheral surface of the intermediate sleeve 42. The plate spring 44 has a slit 441 through which the boss portions 421 are inserted at one end on the side wall 201 side and a screw hole through which a screw 442 is inserted at the other end. The plate spring 44 is fixed to the outer peripheral surface of the intermediate sleeve 42 by inserting the boss portions 421 of the intermediate sleeve 42 into the slit 441 and screwing the screw 442 into the screw hole 422.

The plate spring 44 can be made of metal, and presses an inner surface of the paper core 30 outward when the paper core 30 (ribbon roll) is attached to the outer side of the intermediate sleeve 42 so as to fix the paper core 30 to the intermediate sleeve 42. The plate spring 44 protrudes from the outer peripheral surface of the intermediate sleeve 42 to such an extent that the intermediate sleeve 42 can be inserted into the paper core 30. The plate spring 44 has a peripheral width narrower than a width of the antenna 40 along a peripheral direction of the fixing shaft 41.

The antenna 40 can be a sheet made of metal (metallic sheet) and provided on the outer peripheral surface of the fixing shaft 41. A wiring 401 electrically connected to the antenna 40 and extending in the longitudinal direction of the fixing shaft 41 is provided on the outer peripheral surface of the fixing shaft 41. The antenna 40 and the wiring 401 can be, for example, a continuous metal foil, and may be formed by patterning a metal foil on a surface of a flexible substrate or the like.

A magnetic sheet 45 is provided between the outer peripheral surface of the fixing shaft 41 and the antenna 40. The magnetic sheet 45 is provided such that a magnetic field formed by the antenna 40 does not pass through the fixing shaft 41. Therefore, the magnetic sheet 45 has a size that is a bit larger than that of the antenna 40 so as to sufficiently block the antenna 40 from the fixing shaft 41.

Since the antenna 40 is separated from the outer peripheral surface of the fixing shaft 41 by a thickness of the magnetic sheet 45, an end portion of the wiring 401 on an antenna 40 side is slightly inclined in a direction going away from the outer peripheral surface of the fixing shaft 41 toward the antenna 40. Since the bearing 43 is provided between the intermediate sleeve 42 and the fixing shaft 41, the inner diameter of the intermediate sleeve 42 can be sufficiently larger than an outer diameter of the fixing shaft 41. Therefore, when the fixing shaft 41 is inserted into the intermediate sleeve 42 or when the intermediate sleeve 42 rotates with respect to the fixing shaft 41, an inner surface of the intermediate sleeve 42 is not in sliding contact with the antenna 40 and the wiring 401.

Figure 4:
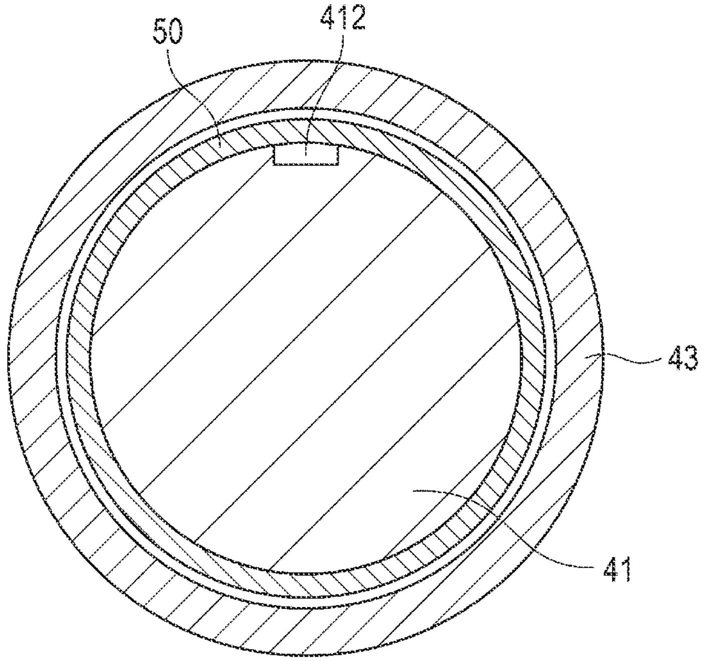
FIG. 4 is a cross-sectional view of a portion of a feeding shaft.

As shown in FIGS. 2 and 4, the fixing shaft 41 has a groove-shaped recess portion 412 (a groove) provided in the outer peripheral surface along the longitudinal direction thereof. A width of the recess portion 412 along the peripheral direction of the fixing shaft 41 is slightly narrower than a width of the wiring 401. A depth of the recess portion 412 is slightly smaller than a thickness of the wiring 401. The magnetic sheet 45 is bonded and attached to the outer peripheral surface of the fixing shaft 41, and then the antenna 40 is attached to the magnetic sheet 45 in an overlapping manner. The wiring 401 is bonded and attached to a bottom surface of the recess portion 412. In FIG. 4, specific illustration of the wiring 401 is omitted.

A protective sleeve 50 is provided near the end portion of the fixing shaft 41 on the side wall 201 side. An inner diameter of the protective sleeve 50 is substantially the same as the outer diameter of the fixing shaft 41, and an outer diameter thereof is slightly smaller than an inner diameter of the bearing 43. That is, there is a gap corresponding to a thickness of the protective sleeve 50 between the intermediate sleeve 42 and the fixing shaft 41. The protective sleeve 50 is interposed between the wiring 401 and the bearing 43 and is fitted and fixed to the end portion of the fixing shaft 41.

When the fixing shaft 41 to which the protective sleeve 50 has been fixed is inserted into the intermediate sleeve 42 having the bearing 43 fitted to one end thereof and the intermediate sleeve 42 is attached to the fixing shaft 41, an inner peripheral surface of the bearing 43 comes into contact with the outer peripheral surface of the protective sleeve 50. Since the inner diameter of the bearing 43 is slightly larger than the outer diameter of the protective sleeve 50 and there is a slight gap therebetween, the intermediate sleeve 42 including the bearing 43 is rotatable with respect to the fixing shaft 41 including the protective sleeve 50. When the intermediate sleeve 42 rotates with respect to the fixing shaft 41, the protective sleeve 50 prevents a failure of the intermediate sleeve 42 coming into sliding contact with the wiring 401 accommodated and disposed in the recess portion 412 of the fixing shaft 41.

Figure 5:
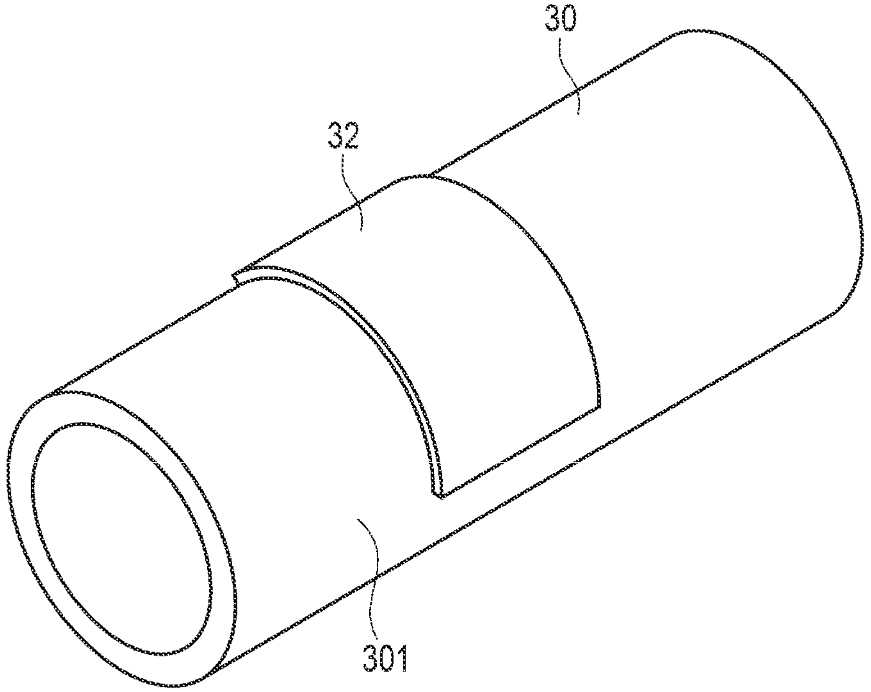
FIG. 5 is a perspective view showing a paper core of a ribbon roll.

As shown in FIG. 5, the paper core 30 of the ribbon roll to be mounted on the feeding shaft 10 includes an IC tag 32 for wireless communication. The IC tag 32 has a rectangular sheet shape and is attached to an outer peripheral surface 301 of the paper core 30 by being bonded at a substantially center position of the paper core 30 along the axial direction. The ink ribbon is overlapped outside of the IC tag 32 and wound around the outer peripheral surface of the paper core 30. In some examples, the IC tag 32 may be provided on an outer surface of the paper core 30, an inner surface of the paper core 30, or inside the paper core 30, or the like. The IC tag is an example of a wireless tag.

Figure 6:
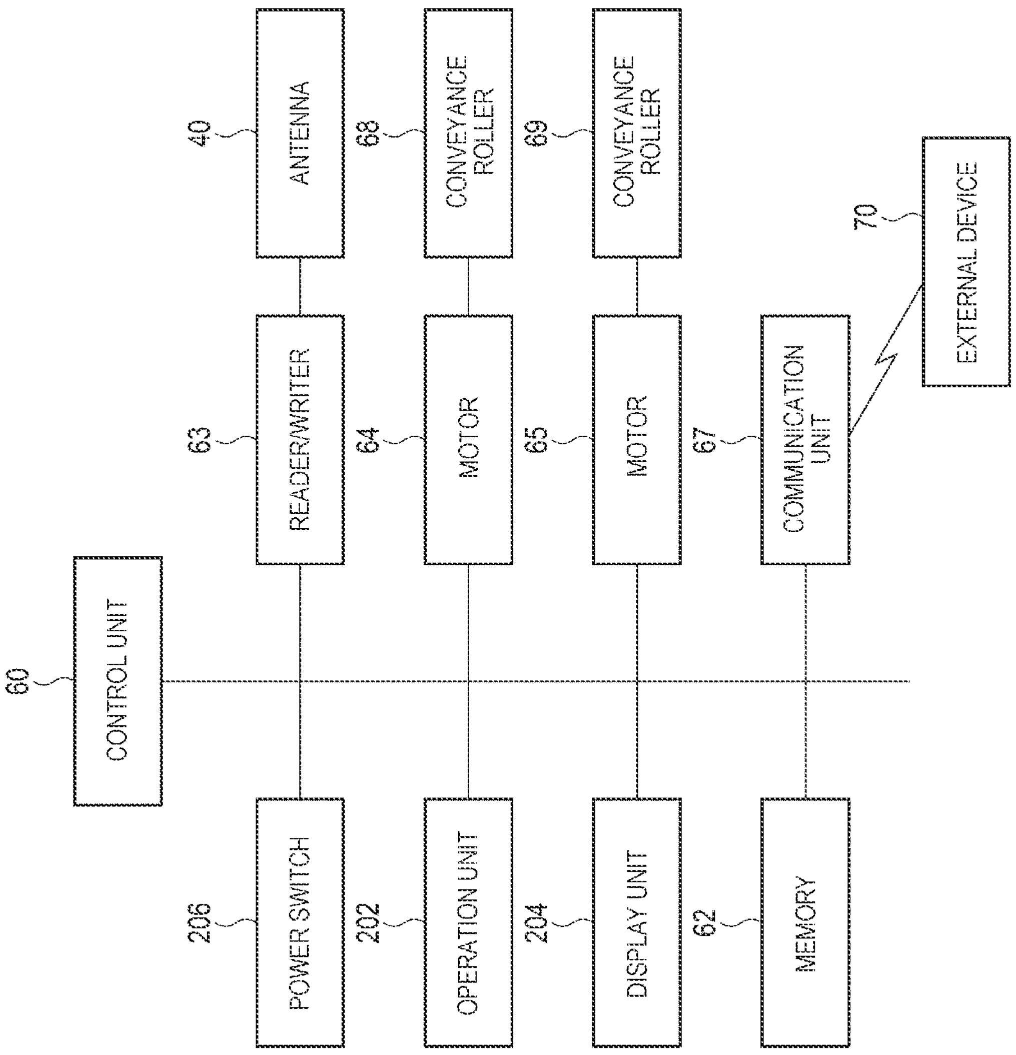
FIG. 6 is a block diagram of a control system.

As shown in FIG. 6, the label printer 100 includes a control unit 60 that sets a printing speed in accordance with a type of ink ribbon being used. The control unit 60 connects to the power switch 206, the operation unit 202, the display unit 204, a memory 62, a reader/writer 63, motors 64 and 65, and a communication unit 67.

The memory 62 stores a control program and data related to the printing speed suitable for ink ribbons. The reader/writer 63 wirelessly communicates with the IC tag 32 via the antenna 40, writes data to the IC tag 32, and reads data from the IC tag 32. The motor 64 rotates the conveyance roller 68 that draws out the label paper from the label paper roll. The motor 65 rotates a conveyance roller 69 that conveys the ink ribbon for printing operations. The communication unit 67 transmits and receives various types of data to and from an external device 70 such as a host computer.

After the ribbon roll on the feeding shaft 10 is replaced and the cover 4 of the housing 2 is closed and the power switch 206 is turned on, the control unit 60 controls the reader/writer 63 to read data from the IC tag 32 via the antenna 40. The IC tag 32 stores data related to the ink ribbon wound around the paper core 30. The data related to the ink ribbon includes, for example, a product name, a type (e.g., a ribbon for plain paper or a ribbon for thick paper), a width, a length, a manufacturing date, a serial number (manufacturing number), and a remaining amount of the ink ribbon.

Thereafter, the control unit 60 reads, from the memory 62, the printing speed suitable for the type of ink ribbon identified by reading the IC tag 32, and controls the motors 64 and 65 so as to reach the printing speed. The control unit 60 controls the motors 64 and 65, so that printing will be performed at this printing speed until the ink ribbon is used up.

The control unit 60 rewrites the remaining amount of the ink ribbon recorded in the memory 62 when a printing task end. The control unit 60 can display the remaining amount of the ink ribbon via the display unit 204.

In the present embodiment, since the antenna 40 for performing wireless data communication with the IC tag 32 provided on the paper core 30 is provided on the fixing shaft 41, it is possible to make the operations associated with a ribbon roll replacement easier and more efficient as compared with a case where the antenna 40 (or the like) is provided at position on the outside of the ribbon roll. After being attached to the intermediate sleeve 42, the ribbon roll can be attached to the feeding shaft 10 by attaching the intermediate sleeve 42 to the fixing shaft 41.

Since the fixing shaft 41 has the recess portion 412 to which the wiring 401 is attached and there is a sufficient gap between the outer peripheral surface of the fixing shaft 41 to which the antenna 40 is attached and the inner surface of the intermediate sleeve 42, when the ribbon roll is replaced, the failure of the intermediate sleeve 42 coming into contact with the wiring 401 of the antenna 40 rarely occurs. In addition, the recess portion 412 to which the wiring 401 of the antenna 40 is attached facilitates positioning of the wiring 401 on the fixing shaft 41.

Second Embodiment

Figure 7:
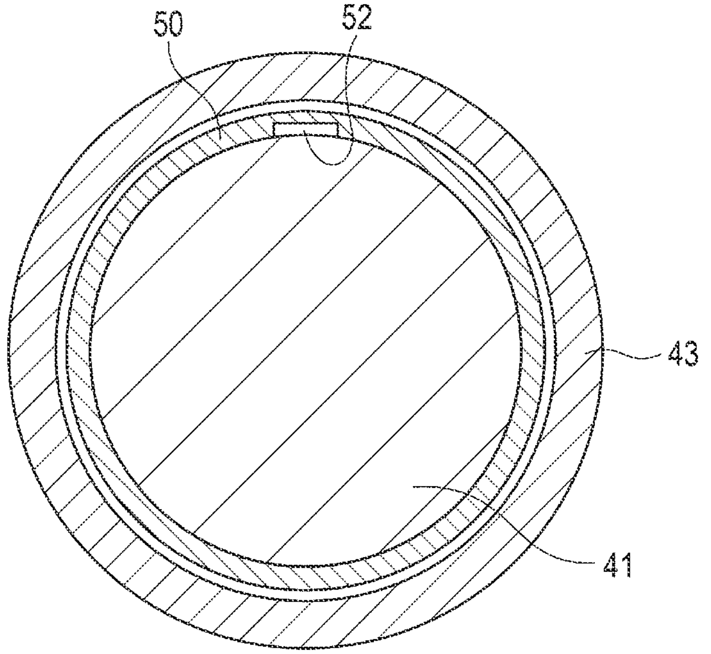
FIG. 7 is a cross-sectional view of a feeding shaft according to a second embodiment.

As shown in FIG. 7, instead of providing the recess portion 412 for accommodating the wiring 401 on the outer peripheral surface of the fixing shaft 41, a groove-shaped recess portion 52 (groove) through which the wiring 401 passes may be provided on an inner surface of the protective sleeve 50. When the recess portion 412 is formed on the outer peripheral surface of the fixing shaft 41, the groove is formed in the outer peripheral surface of the fixing shaft 41 by cutting or the like, but it can be easier to form the recess portion 52 on the inner surface of the protective sleeve 50 so manufacturing costs can be reduced by the second embodiment.

Third Embodiment

Figure 8:
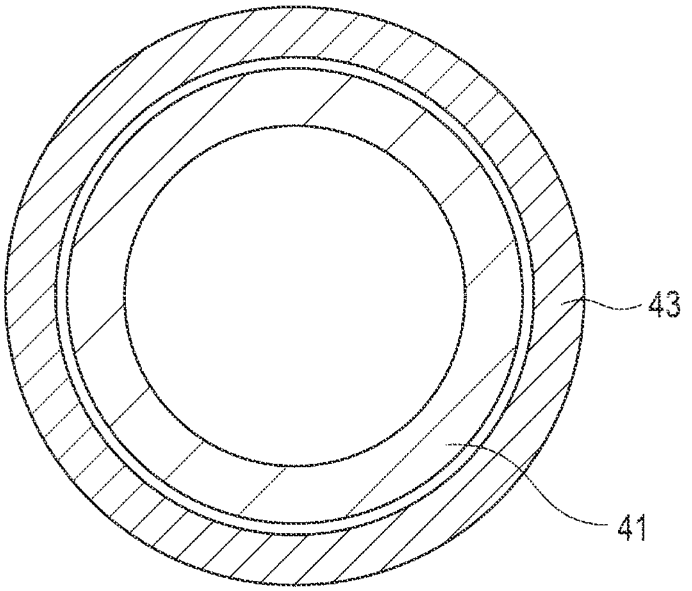
FIG. 8 is a cross-sectional view of a feeding shaft according to a third embodiment.

As shown in FIG. 8, the fixing shaft 41 may be hollow to allow the wiring 401 of the antenna 40 to pass therethrough. In this case, it is necessary to form a hole through which the wiring 401 (connected to the antenna 40 on the outer peripheral surface of the fixing shaft 41) passes so as to permit wiring connections between the outer peripheral surface and an inner surface of the fixing shaft 41. Since the fixing shaft 41 is hollow, there is no need to provide the recess portion for accommodating the wiring 401, and there is similarly no need to provide the protective sleeve 50 for protecting the wiring 401.

While embodiments have been described, the embodiments have been presented by way of examples only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the exemplary embodiments.

What is claimed is:

1. A printing apparatus, comprising:

a shaft on which an ink ribbon roll with a wireless tag can be mounted, the ink ribbon roll configured to rotate about the shaft;

an antenna for communication with the wireless tag on an outer peripheral surface of the shaft;

a wiring on the outer peripheral surface of the shaft and connected to the antenna;

a protective sleeve configured to be between the shaft and the mounted ink ribbon roll, the protective sleeve covering an end portion of the shaft and the wiring at the end portion;

a bearing outside the protective sleeve, the bearing being rotatable about the protective sleeve; and a printing unit configured to perform printing on a medium to be printed with ink ribbon drawn out of the ink ribbon roll.

2. The printing apparatus according to claim 1, wherein the wiring is in a groove formed in the outer peripheral surface of the shaft.

3. The printing apparatus according to claim 1, wherein the wiring extends in a groove formed in an inner surface of the protective sleeve.

4. The printing apparatus according to claim 1, further comprising:

an intermediate sleeve with an outer peripheral portion for detachably mounting to an inner core of the ink ribbon roll, the intermediate sleeve fixing to the bearing and rotating about the shaft without contacting the antenna and the wiring.

5. The printing apparatus according to claim 1, wherein the antenna comprises a metal foil.

6. The printing apparatus according to claim 1, wherein the printing unit comprises a thermal printhead.

7. The printing apparatus according to claim 1, wherein the shaft is a solid metal rod, the wiring is in a groove formed in the outer peripheral surface of the shaft, and the antenna and the wiring comprise a metal foil.

8. The printing apparatus according to claim 1, wherein the shaft is a solid metal rod.

9. The printing apparatus according to claim 1, wherein the antenna and the wiring comprise a metal foil.

10. A thermal label printer, comprising:

a label paper feed shaft to hold a label paper roll;

a ribbon feed shaft to hold an ink ribbon roll with a wireless tag;

a thermal printing unit to receive label paper from the label paper roll and ink ribbon from the ribbon feed shaft; and a tag reader to read the wireless tag of the ink ribbon roll held by the ribbon feed shaft;

a control unit configured to control the speed of ink ribbon drawn out to the thermal printing unit based on tag information read from the wireless tag of the ink ribbon roll held by the ribbon feed shaft, wherein the ribbon feed shaft includes:

a metal shaft;

an antenna for communication with the wireless tag on an outer peripheral surface of the metal shaft;

a wiring on the outer peripheral surface of the metal shaft, the wiring connecting the antenna to the tag reader;

a protective sleeve configured to be between the metal shaft and the ink ribbon roll, the protective sleeve covering an end portion of the metal shaft and the wiring at the end portion; and a bearing outside the protective sleeve, the bearing being rotatable about the protective sleeve.

11. The thermal label printer according to claim 10, wherein the wiring is in a groove formed in the outer peripheral surface of the metal shaft.

12. The thermal label printer according to claim 10, wherein the wiring extends in a groove formed in an inner surface of the protective sleeve.

13. The thermal label printer according to claim 10, further comprising:

an intermediate sleeve with an outer peripheral portion for detachably mounting to an inner core of the ink ribbon roll, the intermediate sleeve fixing to the bearing and rotating about the shaft without contacting the antenna and the wiring.

14. The thermal label printer according to claim 10, wherein the antenna comprises a metal foil.

15. The thermal label printer according to claim 10, wherein the antenna and the wiring comprise a metal foil.

16. The thermal label printer according to claim 15, wherein the wiring is in a groove formed in the outer peripheral surface of the metal shaft.

* * * * *